United States Patent
Steffen

(10) Patent No.: US 7,559,477 B2
(45) Date of Patent: Jul. 14, 2009

(54) LOW VOLTAGE SIGNAL STRIPPING CIRCUIT FOR AN RFID READER

(75) Inventor: Dale A. Steffen, Aurora, CO (US)

(73) Assignee: Assa Abloy AB, Stockholm (SE)

( * ) Notice: Subject to any disclaimer, the term of this patent is extended or adjusted under 35 U.S.C. 154(b) by 186 days.

(21) Appl. No.: 11/518,060

(22) Filed: Sep. 8, 2006

(65) Prior Publication Data

US 2007/0001008 A1    Jan. 4, 2007

Related U.S. Application Data

(63) Continuation of application No. 10/728,735, filed on Dec. 5, 2003, now Pat. No. 7,124,942.

(51) Int. Cl.
*G06K 7/10* (2006.01)

(52) U.S. Cl. .................. 235/472.01; 235/451; 340/10.1; 340/10.3; 340/10.4; 340/572.1; 340/572.4; 343/701; 343/742; 343/867; 455/41.2

(58) Field of Classification Search .......... 340/10.1, 340/572.1, 572.7, 573.1, 834, 10.3, 10.4, 340/572.4; 235/472.01, 451; 343/701, 742, 343/867; 455/41.2
See application file for complete search history.

(56) References Cited

U.S. PATENT DOCUMENTS

| | | | |
|---|---|---|---|
| 4,730,188 A | 3/1988 | Milheiser | |
| 5,541,574 A | 7/1996 | Lowe et al. | |
| 5,594,384 A | 1/1997 | Carroll et al. | |
| 5,878,133 A | 3/1999 | Zhou et al. | |
| 6,138,005 A | 10/2000 | Park | |
| 6,608,995 B1 | 8/2003 | Kawasaki et al. | |
| 6,617,832 B1 | 9/2003 | Kobayashi | |
| 2001/0007815 A1 | 7/2001 | Philipsson | |
| 2002/0044058 A1 | 4/2002 | Heinrich et al. | |
| 2002/0109636 A1 | 8/2002 | Johnson et al. | |
| 2004/0113790 A1* | 6/2004 | Hamel et al. ............. | 340/572.1 |
| 2004/0119504 A1 | 6/2004 | Baude et al. | |
| 2004/0246100 A1 | 12/2004 | Kranz | |
| 2005/0156806 A1 | 7/2005 | Ohta et al. | |

OTHER PUBLICATIONS

European Search Report for European Patent Application No. EP 04257458.2, mailed Feb. 19, 2008.

* cited by examiner

*Primary Examiner*—Allyson N Trail
(74) *Attorney, Agent, or Firm*—Sheridan Ross P.C.

(57) ABSTRACT

A reader of an RFID system has excitation circuitry for generating a higher voltage excitation signal, receiving circuitry for reading a lower voltage transponder signal and an antenna coupled with the excitation circuitry for transmitting the excitation signal and coupled with the receiving circuitry for receiving the transponder signal. The receiving circuitry includes a low voltage signal stripping circuit coupled with the antenna for isolating the transponder signal from the excitation signal preliminary to the receiving circuitry reading the transponder signal. The bulk of the components of the low voltage signal stripping circuit are low voltage components, which can be included in an application specific integrated circuit.

20 Claims, 3 Drawing Sheets

LOW VOLTAGE SIGNAL STRIPPING CIRCUIT FOR AN RFID READER

CROSS-REFERENCE TO RELATED APPLICATIONS

This application is a Continuation of application Ser. No. 10/728,735, now U.S Pat No. 7,124,942, filed Dec. 5, 2003.

TECHNICAL FIELD

The present invention relates generally to radio frequency identification systems, and more particularly, to a low voltage signal stripping circuit for a reader of a radio frequency identification system.

BACKGROUND OF THE INVENTION

Radio frequency identification (RFID) systems generally consist of at least one host reader and a plurality of passive transponders, which are commonly termed credentials, cards, tags, or the like. An essential function of the host reader is to "excite" or power up the transponder. The reader transmits high voltage excitation signals into the surrounding space, which are received by a transponder proximal to the reader and which provide operational electrical power for the internal electronics of the recipient transponder. Once the transponder is powered up, it communicates information to the reader in a contactless manner. In particular, the powered up transponder transmits communication signals in the form of electromagnetic waves into the surrounding space which are received by the reader. Accordingly, all of the transponders and readers each have a transmitting function and a receiving function.

The transmitting and receiving functions may be performed by separately dedicated discrete electronic components, but more commonly at least some of the electronic components are combined into integrated circuits or shared between different functions within the transponder or reader to reduce manufacturing costs. For example, the internal electronics of the transponder may be limited to a single antenna for transmitting transponder signals and receiving signals and to an integrated circuit for performing the remaining necessary operational functions of the transponder.

A low-cost reader may desirably include an application specific integrated circuit (ASIC), which is an integration of low voltage-rated components exclusively, since low voltage-rated components are generally significantly less expensive than high voltage-rated components. Nevertheless, a reader incorporating an ASIC is only cost-effective if the number of additional electronic components needed to complete the internal electronics of the reader are minimized. A low-cost reader may also desirably employ a single antenna to perform both the excitation signal transmitting function and the transponder signal receiving function. However, this results in the superposition of the smaller voltage transponder signal on the higher voltage excitation signal which requires standoff of the high voltage excitation signal from the low voltage-rated components included within the internal electronics of the reader.

Standoff of the high voltage excitation signal is generally the single most difficult function to incorporate into an ASIC of the reader because multiple high voltage-rated components, which are not permitted in an ASIC, are usually required for the standoff function. Accordingly standoff is typically performed by special circuitry upstream of the ASIC, which strips the transponder signal off the excitation signal before the transponder signal is amplified and detected by the reader. Many prior art techniques for stripping the transponder signal utilize special diode detection circuitry, which usually requires several high voltage-rated components (e.g., diodes, resistors and capacitors) to tolerate the relatively high voltage across the reader antenna. Such high voltage-rated components are relatively expensive and cannot be incorporated into an ASIC as noted above.

The present invention recognizes a need for alternate low-cost receiving circuitry in a reader which effectively strips a low voltage transponder signal off of a high voltage excitation signal. Accordingly, it is an object of the present invention to provide a low-cost, effective low voltage signal stripping circuit. More particularly, it is an object of the present invention to provide a low voltage signal stripping circuit which requires a minimal number of high voltage components. It is another object of the present invention to provide a low voltage signal stripping circuit having a plurality of low voltage components which are incorporated into an ASIC.

These objects and others are accomplished in accordance with the invention described hereafter.

SUMMARY OF THE INVENTION

The present invention is a low voltage signal stripping circuit for a reader of an RFID system. The low voltage signal stripping circuit comprises an inlet resistor, an amplifier, a feedback circuit and a DC shift voltage or a DC shift current source. The inlet resistor is preferably a high voltage component and the amplifier and the feedback circuit are preferably low voltage components. The amplifier and the feedback circuit are preferably included in an application specific integrated circuit. The feedback circuit preferably has a pathway including a pair of clamping diodes aligned in series and a pathway including a feedback resistor having a resistance. More particularly, the feedback circuit preferably has a first pathway including a first pair of clamping diodes aligned in series in a first direction, a second pathway including a second pair of clamping diodes aligned in series in a second direction opposite the first direction, and a third pathway including a feedback resistor. The inlet resistor preferably has a resistance about equal to the resistance of the feedback resistor.

The low voltage signal stripping circuit preferably further comprises a summing node positioned upstream of the amplifier and downstream of the inlet resistor, feedback circuit and DC shift voltage or DC shift current source to sum outputs from the inlet resistor, the feedback circuit and the DC shift voltage or DC shift current source. The amplifier has a first input coupled with the inlet resistor and a second input tied to a reference voltage. The first input of the amplifier is preferably an inverting negative input, while the second input of the amplifier is preferably a non-inverting positive input.

In accordance with another embodiment, the present invention is a reader of an RFID system comprising excitation circuitry for generating a higher voltage excitation signal, receiving circuitry for reading a lower voltage transponder signal, and an antenna which is coupled with the excitation circuitry for transmitting the excitation signal and which is coupled with the receiving circuitry for receiving the transponder signal. The receiving circuitry includes the above-recited low voltage signal stripping circuit. The low voltage signal stripping circuit is coupled with the antenna for isolating the transponder signal from the excitation signal preliminary to reading the transponder signal with the receiving circuitry. The inlet resistor of the low voltage signal stripping circuit is preferably positioned in series between the antenna of the reader and the amplifier of the low voltage signal stripping circuit.

In accordance with another embodiment, the present invention is a low voltage signal stripping circuit for a reader of an RFID system which is alternately characterized from the above-recited low voltage signal stripping circuit. The present low voltage signal stripping circuit is characterized as comprising means for creating a low voltage output signal from a high voltage antenna signal which is input to the low voltage signal stripping circuit. The low voltage stripping circuit further comprises means for creating a DC shift voltage or a DC shift current, means for selectively distributing a feedback signal from an amplifier having an output operating range, means for creating a summed signal by summing the low voltage output signal, the selectively distributed feedback signal, and the DC shift voltage or DC shift current, and means for inputting the summed signal to an amplifier input of the amplifier.

The output operating range of the amplifier has an upper voltage limit. The low voltage output signal preferably has a low voltage value which is below the upper voltage limit of the output operating range. The high voltage antenna signal preferably has a high voltage value which is above the upper voltage limit of the output operating range of the amplifier.

The amplifier preferably has a second amplifier input in addition to the above-recited amplifier input. The low voltage signal stripping circuit preferably further comprise means for creating a reference voltage and means for inputting the reference voltage to the second amplifier input.

In accordance with another embodiment, the present invention is a method for processing a high voltage antenna signal waveform including a low voltage transponder signal containing readable information superposed on a high voltage excitation signal. The method comprises the steps of providing the high voltage antenna signal waveform, specifying a location on the waveform where a waveform portion containing the readable information is to be isolated, specifying a size of the waveform portion to be isolated at the specified location on the waveform, isolating the waveform portion, and reading the readable information on the waveform portion. The location on the waveform is preferably specified by specifying a relative voltage value on the waveform. The size of the waveform portion is preferably specified by specifying an absolute voltage range applied to the waveform at the specified location.

In accordance with another embodiment, the present invention is a method for processing a high voltage antenna signal waveform comprising the steps of receiving a high voltage antenna signal containing readable information from an antenna at an input of a low voltage stripping circuit. A voltage of the high voltage antenna signal is limited to create a low voltage output signal containing the readable information. The voltage of the high voltage antenna signal preferably exceeds an upper voltage tolerance of the amplifier, while the low voltage output signal preferably has a voltage below an upper voltage tolerance of the amplifier. The voltage of the high voltage antenna signal is preferably limited by passing the high voltage antenna signal through an inlet resistor. The method further comprises creating a DC shift voltage or a DC shift current and selectively distributing a feedback signal from an amplifier having an output operating range. The low voltage output signal, selectively distributed feedback signal, and DC shift voltage or DC shift current are summed to create a summed signal containing the readable information. The summed signal is passed through the amplifier to create an amplifier output signal containing the readable information. The readable information on the amplifier output signal is then read.

The amplifier preferably has a first input, which is more preferably an inverting input, and a second input, which is more preferably a non-inverting input. The first and second inputs are preferably held to essentially a same voltage value. The summed signal is input to the first input and a voltage reference is input to the second input. The amplifier preferably provides a gain to the summed signal in response to the selectively distributed feedback signal to create the amplifier output signal. More particularly, the gain preferably varies as a function of a voltage of the feedback signal distributed to the summed signal. The gain is reduced when the voltage of the feedback signal distributed to the summed signal is outside a predetermined voltage range.

The feedback signal is preferably selectively distributed by a feedback circuit. The feedback circuit has a first pathway with a low impedance to the feedback signal when a voltage of the feedback signal is above an upper limit of a predetermined voltage range, a second pathway with a low impedance to the feedback signal when the voltage of the feedback signal is below a lower limit of the predetermined voltage range, and a third pathway with a low impedance to the feedback signal when a voltage of the feedback signal is within the predetermined voltage range.

The present invention will be further understood from the drawings and the following detailed description.

DESCRIPTION OF PREFERRED EMBODIMENTS

Figure 1:
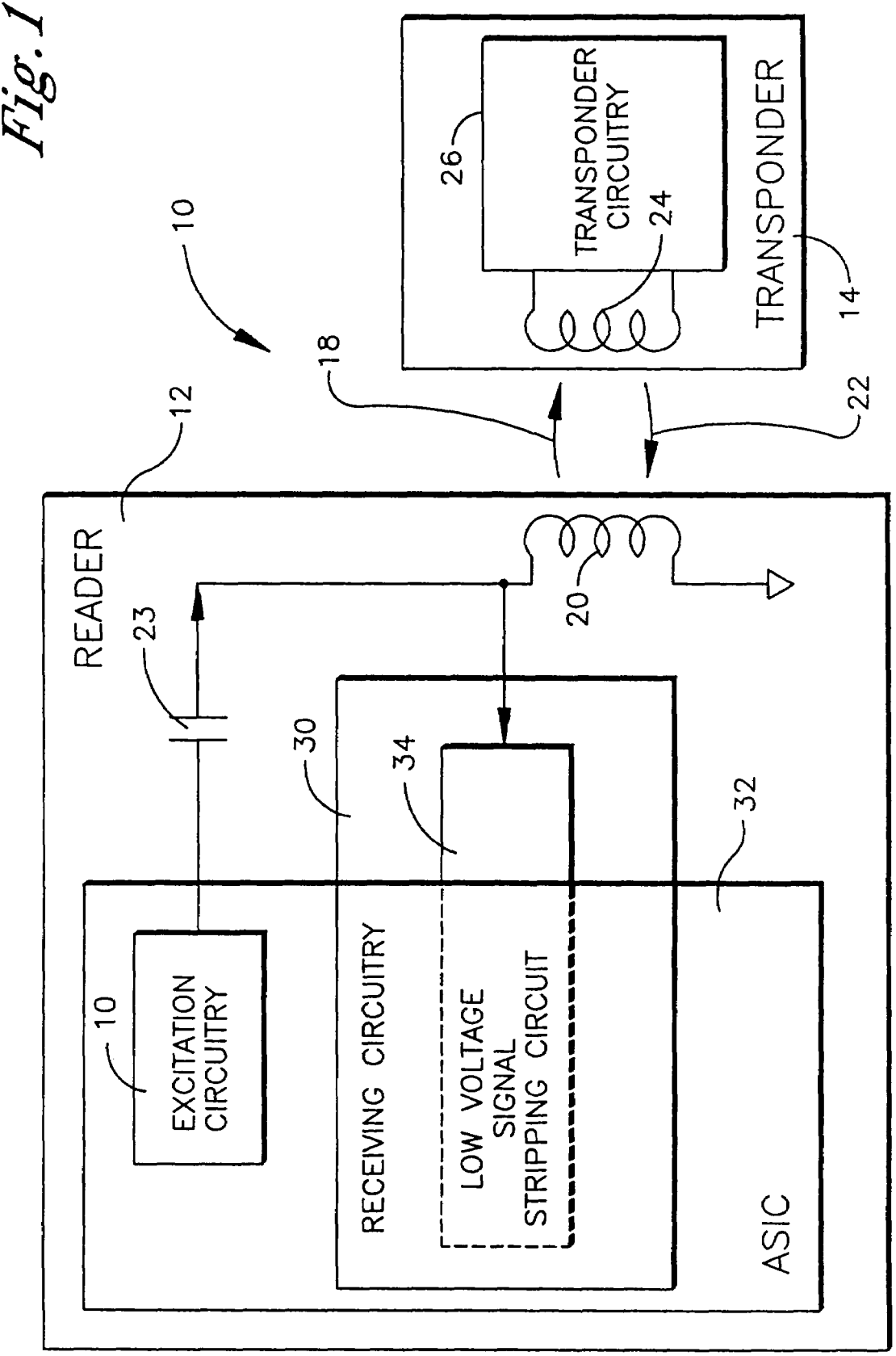
FIG. 1 is a schematic block diagram of a radio frequency identification system employing a low voltage signal stripping circuit of the present invention.

Referring to FIG. 1, a radio frequency identification (RFID) system employing an embodiment of the low voltage signal stripping circuit of the present invention is shown and generally designated 10. The RFID system 10 comprises a reader 12 and a transponder 14. The reader 12 is preferably an active device and the transponder 14 is preferably a passive device.

An "active device" is defined herein as an electrically powered device which has an internal electrical power supply, such as a rechargeable or disposable battery, or is hard wired to an external electrical power supply. The electrical power supply is physically coupled with the active device to directly supply essentially all of the electrical power required to operate the active device. Thus, the active device is continuously operational for its intended purpose upon being physically coupled with the electrical power supply.

A "passive device" is also an electrically powered device, but is not physically coupled with an electrical power supply.

The electrical power required to operate the passive device is indirectly supplied to the passive device by electromagnetic waves, which are propagated through open space to the passive device from a remote source. Thus, the passive device is only intermittently operational for its intended purpose, wherein the operational state of the passive device is a function of whether the passive device is receiving electromagnetic waves of sufficient strength.

In the present RFID system 10, the remote source of electromagnetic waves is the reader 12. The electromagnetic waves transmitted from the reader 12 typically have a limited range due to size and power constraints of the reader 12. Thus, the reader 12 and transponder 14 of the RFID system 10 are simultaneously operational only when the transponder 14 is within the range of the reader 12 and, more particularly, when the reader 12 and transponder 14 are positioned in relative proximity to one another such that the transponder 14 receives electromagnetic waves of sufficient strength from the reader 12 to power up the transponder 14.

In most conventional RFID systems, the position of the reader is stationary (i.e., constant) relative to the surrounding environment, while the position of the transponder is portable (i.e., variable) within the surrounding environment. In such cases, the user of the RFID system moves the portable transponder into relative proximity with the stationary reader to enable simultaneous operation of the both the transponder and reader. In some conventional RFID systems, however, the position of the reader may be portable relative to the surrounding environment, while the position of the transponder is either portable or stationary. In the case of a portable reader and a stationary transponder, the user moves the portable reader into relative proximity with the stationary transponder to enable simultaneous operation of the both the transponder and reader. In the case of a portable reader and a portable transponder, the user may move both the portable reader and the portable transponder into relative proximity with one another to enable simultaneous operation of the both the transponder and reader. The present invention is not limited to any one of the above-recited RFID system configurations.

The electromagnetic waves, which are transmitted from the reader 12 through open space to the transponder 14 for electrically powering up the transponder 14, are termed "excitation signals." The reader 12 comprises a plurality of functional elements including excitation circuitry 16 for generating an excitation signal 18 and a reader antenna 20 for transmitting the excitation signal 18 into the open space of the external environment 22 surrounding the reader 12. The excitation signal 18 is characterized as a high voltage signal preferably having a relatively high voltage within a range of about 75 to 125 volts zero to peak. The reader 12 preferably further comprises a tuning capacitor 23 for the reader antenna 20.

The transponder 14 likewise comprises a plurality of functional elements including a transponder antenna 24 for receiving the excitation signal 18 and transponder circuitry 26 for generating a communication signal termed a transponder signal 28. The transponder circuitry 26 is housed within the transponder 14 and is coupled with the transponder antenna 24, which communicates electrical power resulting from reception of the excitation signal 18 to the transponder circuitry 26. The transponder antenna 24 has an excitation signal reception range which is generally about 4 to 5 inches when the reader antenna 20 and transponder antenna 24 are coaxially aligned. When the transponder 14 and/or reader 12 is moved to a proximal position such that the distance between reader 12 and transponder 14 is within the excitation signal reception range of the transponder antenna 24, the transponder antenna 24 receives the excitation signal 18 at a sufficient strength to power up the transponder circuitry 26, thereby activating the transponder 14.

Upon activation, the transponder circuitry 26 generates the transponder signal 28, which contains readable information copied or otherwise derived from the memory of the transponder circuitry 26. The transponder signal 28 is a communication signal in the form of an electromagnetic wave like the excitation signal 18. It is noted that communication signals of RFID systems (i.e., excitation and transponder signals) are typically termed radio frequency signals. However, the excitation and transponder signals 18, 28 of the present invention are not limited exclusively to signals having specific frequencies within the narrow "radio frequency" range, as "radio frequency" is commonly defined for the radio communication industry.

The transponder 14 transmits the transponder signal 28 into the open space of the external environment 22 via the transponder antenna 24. The transponder signal 28 is characterized as a low voltage signal preferably having a relatively low voltage within a range of about 1 to 100 millivolts at the reader antenna 20. The transponder antenna 24, as described and shown, is a single antenna which performs both the receiving and transmitting functions of the transponder 14. In particular, the transponder antenna 24 receives the excitation signal 18 from the external environment 22 and transmits the transponder signal 28 into the external environment 22. Thus, the transponder antenna 24 is termed a "dual-function antenna." However, the present invention is not limited to an RFID system having a transponder with a single dual-function transponder antenna. The present invention alternately encompasses an RFID system having a transponder with two separate transponder antennas, which separately perform the receiving and transmitting functions of the transponder.

The reader antenna 20 is likewise shown as a single dual-function antenna which performs both the receiving and transmitting functions of the reader 12. In particular, the reader antenna 20 receives the transponder signal 28 from the external environment 22 and transmits the excitation signal 18 into the external environment 22. Accordingly, the excitation signal 18 generated by the excitation circuitry 16 and the transponder signal 28 generated by the transponder circuitry 26 may both be on the reader antenna 20 at the same time with the low voltage transponder signal 28 superposed on the high voltage excitation signal 18.

An exemplary transponder having utility in the RFID system 10 of the present invention is disclosed in U.S. Pat. Nos. 4,730,188 and 5,541,574, incorporated herein by reference. The disclosed exemplary transponder consists of a single dual-function transponder antenna for receiving an excitation signal and transponder circuitry for generating a transponder signal. The entire transponder circuitry is disclosed as being wholly integrated within a single integrated circuit chip. An exemplary dual-function reader antenna and exemplary excitation circuitry having utility in the reader of the RFID system 10 are likewise disclosed in U.S. Pat. Nos. 4,730,188 and 5,541,574.

In addition to the excitation circuitry 16 and reader antenna 20, the reader 12 further comprises receiving circuitry 30 for reading the readable information contained in the transponder signal 28 received by the reader antenna 20 in accordance with any number of techniques well known to the skilled artisan such as, for example, disclosed in U.S. Pat. No. 4,730, 188. The receiving circuitry 30 includes a low voltage signal stripping circuit 34. Both the low voltage signal stripping circuit 34 and excitation circuitry 16 are coupled in parallel with the reader antenna 20. Accordingly, the function of the low voltage signal stripping circuit 34 is to isolate the transponder signal 28 from the excitation signal 18 preliminary to reading the transponder signal 28. Most of the receiving circuitry 30 and excitation circuitry 16 is included within an application specific integrated circuit (ASIC) 32, which is an active circuit powered by the external or internal power supply (not shown) of the reader 12.

Figure 2:
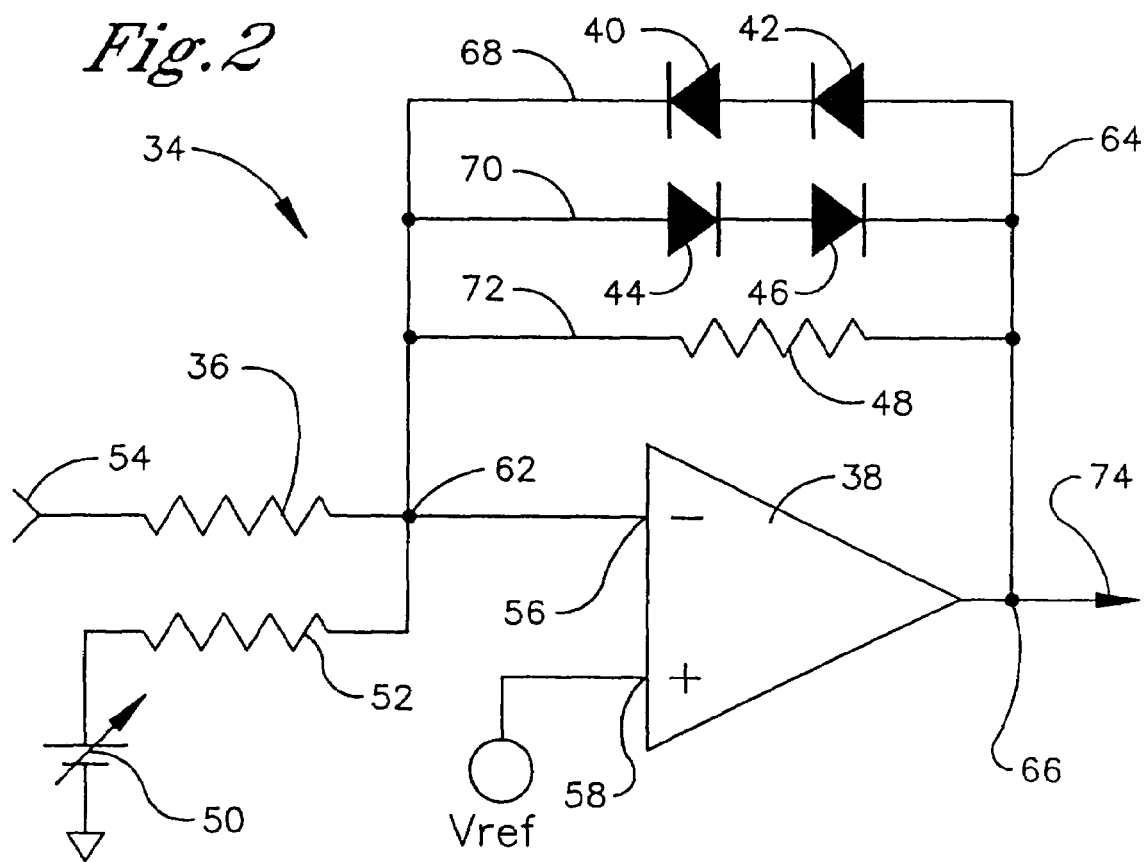
FIG. 2 is a conceptualized circuit diagram of the low voltage signal stripping circuit of FIG. 1.

Referring additionally to FIG. 2, the low voltage signal stripping circuit 34 comprises a high voltage inlet resistor 36, an operational amplifier 38, a first pair of clamping diodes 40, 42, a second pair of clamping diodes 44, 46, a feedback resistor 48, a DC shift voltage source 50, a DC shift voltage resistor 52, and a stripping circuit input 54. The stripping circuit input 54 is coupled with the reader antenna 20 and the inlet resistor 36 is positioned in series downstream of the stripping circuit input 54. The inlet resistor 36 is selected to isolate the internal circuitry of the ASIC 32 from high voltage antenna signals generated by the reader antenna 20 and transmitted to the stripping circuit input 54. As such, the inlet resistor 36 preferably has a resistance about equal to the resistance of the feedback resistor 48.

The operational amplifier 38 is a differential amplifier having a negative input 56 and a positive input 58. The negative input 56 is inverting (i.e., a negative input signal creates a positive output signal), while the positive input 58 is non-inverting (i.e., a positive input signal creates a positive output signal). The positive input 58 of the operational amplifier 38 is tied to $V_{ref}$, while the negative input 56 is coupled with a summing node 62, which sums a DC shift voltage from the DC shift voltage source 50, the inlet resistor output signal from the inlet resistor 36, and a feedback signal from a feedback circuit 64 of the operational amplifier 38.

The feedback circuit 64 consists of the first pair of clamping diodes 40, 42, the second pair of clamping diodes 44, 46, and the feedback resistor 48, all positioned in parallel to one another. Both diodes of the first pair of clamping diodes 40, 42 are aligned in series in a first direction, while both diodes of the second pair of clamping diodes 44, 46 are aligned in series in a second direction opposite the first direction.

It is noted that the inlet resistor 36, which is external to the ASIC 32, is the only component of the low voltage signal stripping circuit 34 that must standoff the relatively high voltage antenna signals from the reader antenna 20. Standard resistors are generally capable of standing off such high voltages. All remaining components of the low voltage signal stripping circuit 34 are relatively inexpensive low voltage components, which can be incorporated into the ASIC 32. Significant economies are realized in the production of the resulting reader 12 by incorporating the majority of the low voltage signal stripping circuit 34 into the ASIC 32.

A method of operating the low voltage stripping circuit 34 is described hereafter with continuing reference to FIGS. 1 and 2. Operation of the low voltage signal stripping circuit 34 is initiated when the high voltage antenna signal is received at the stripping circuit input 54 from the reader antenna 20. The high voltage antenna signal is a waveform which has the characteristics of a sine wave and which typically has a voltage exceeding the voltage tolerances of the ASIC 32. The high voltage antenna signal comprises the low voltage transponder signal 28 superposed on the high voltage excitation signal 18.

The high voltage antenna signal passes through the inlet resistor 36 and is output as an inlet resistor output signal at the summing node 62. A functional characteristic of the operational amplifier 38, when operating in cooperation with the feedback resistor 48, is that the inverting input 56 is held to the same voltage value as the voltage value $V_{ref}$ of the non-inverting input 58. $V_{ref}$ is generally about one half of the supply voltage of the operational amplifier. Accordingly, $V_{ref}$ is preferably about 2.5 volts. As a result, all the high voltage of the antenna signal is dropped across the inlet resistor 36 and the voltage range of the inlet resistor output signal does not exceed the output operating range of the operational amplifier 38, which is typically between about 0 and +5 volts.

In general terms, the inlet resistor output signal is processed in the low voltage signal stripping circuit 34 by a shifting technique and a clamping technique to specify and isolate a desired portion of the high voltage antenna signal waveform to be read by the reader 12. In particular, the shifting technique specifies a desired location on the waveform where the waveform portion is to be isolated and the clamping technique specifies the size of the waveform portion to be isolated at the specified location on the waveform. More particularly, the shifting technique specifies a desired relative voltage value on the waveform and the clamping technique specifies a desired absolute voltage range which is applied to the waveform at the specified voltage value.

The shifting technique is performed by creating a DC shift voltage using the DC shift voltage source 50, which may, for example, be the electrical power supply of the reader 12 or a battery separate from the electrical power supply of the reader 12. The DC shift voltage is created in accordance with any number of well known techniques within the purview of the skilled artisan. The DC shift voltage is preferably created in correspondence with a location (i.e., voltage value) on the waveform where it is desired to apply the voltage range specified by the clamping technique in a manner described hereafter. As is apparent, the practitioner can apply the specified voltage range to substantially any location on the waveform simply by varying the DC shift voltage.

The clamping technique is performed by the feedback circuit 64. The clamping technique is initiated by conducting a feedback signal from a feedback node 66 at the output of the operational amplifier 38 to one of a plurality of available conductive pathways through the feedback circuit 64. A first pathway 68 is through the first pair of clamping diodes 40, 42, a second pathway 70 is through the second pair of clamping diodes 44, 46, and a third pathway 72 is through the feedback resistor 48. The ultimate pathway conducting the feedback signal through the feedback circuit 64 is a function of the voltage at the feedback node 66 and the properties of the components selected for the feedback circuit 64.

The first pair of clamping diodes 40, 42 is preferably selected so that the impedance of the first pathway 68 to the feedback signal is low when the voltage at the feedback node 66 is above an upper limit of a predetermined voltage range, thereby shorting out the feedback resistor 48 of the third pathway 72. As a result, high voltage feedback signals exceeding the upper limit of the predetermined voltage range are output from the first pathway 68 of the feedback circuit 64 to the summing node 62.

The second pair of clamping diodes 44, 46 is preferably selected so that the impedance of the second pathway 70 to the feedback signal is low when the voltage at the feedback node 66 is below a lower limit of a predetermined voltage range, likewise shorting out the feedback resistor 48 of the third pathway 72. As a result, low voltage feedback signals below the lower limit of the predetermined voltage range are output from the second pathway 70 of the feedback circuit 64 to the summing node 62.

When the voltage at the feedback node 66 is at a desired voltage value within the predetermined voltage range, the impedance of the third pathway 72 to the feedback signal is preferably such that feedback signals having the desired voltage value are output from the third pathway 72 of the feedback circuit 64 to the summing node 62.

The gain of the operational amplifier 38 is directly related to the ratio of the feedback signal over the inlet resistor output signal. When the feedback signal is outside the predetermined voltage range, the operational amplifier 38 provides significantly diminished gain to the signal inputted to the inverting input 56 of the operational amplifier 38. This controls the voltage of the amplifier output signal without driving the operational amplifier 38 into saturation, which is an undesirable non-linear condition. Thus, the feedback circuit 64 is able to maintain the inverting input 56 at a low voltage while the operational amplifier 38 is held in its linear operable range. As a result, high voltage conditions are eliminated at the inverting input 56, which would otherwise damage the operational amplifier 38.

By selecting the predetermined voltage range in correspondence with the predicted voltage range of the transponder signal 28, the feedback circuit 64 only permits the operational amplifier 38 to experience a relatively narrow voltage range of the high voltage antenna signal, which preferably encompasses the transponder signal 28. Thus, the feedback circuit 64 specifies the size of a waveform portion to be read by the reader 12. Consequently, the operational amplifier 38 enables subsequent detection of variations in the transponder signal 28, which are very small relative to the excitation signal and which are otherwise masked by the voltage of the excitation signal. At the same time, the feedback circuit 64 effectively prevents the operational amplifier 38 from experiencing high voltages, thereby avoiding damage to the operational amplifier 38, which is a low voltage component, caused by high voltages.

Performance of the shifting and clamping techniques provides the DC shift voltage and feedback signal at the summing node 62, which are summed with the inlet resistor output signal. The resulting summed signal is input to the operational amplifier 38 via the inverting input 56, thereby producing an amplifier output signal at the amplifier output 74. The amplifier output signal, which contains the readable information of the transponder signal 28, is conveyed to the remaining downstream receiving circuitry 30 where the amplifier output signal undergoes demodulation and detection in a conventional manner to read the information contained therein.

Figure 3:
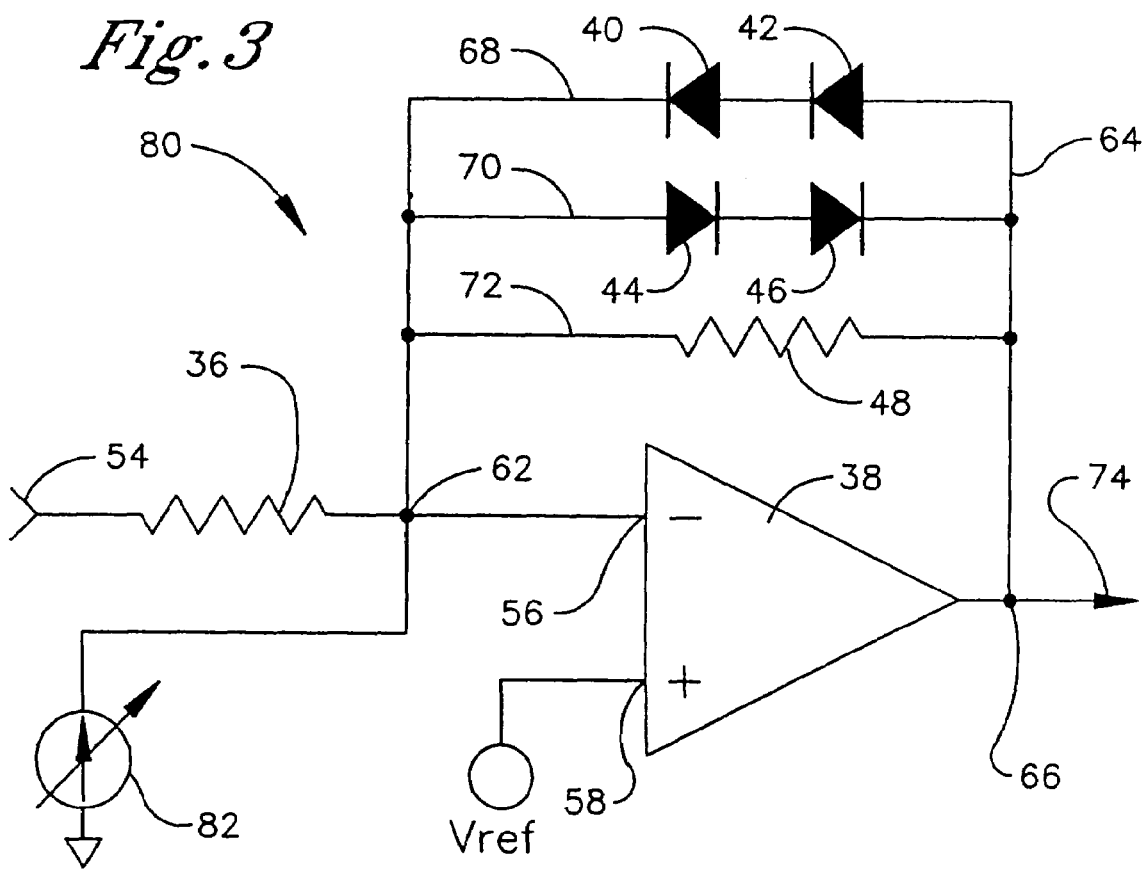
FIG. 3 is a conceptualized circuit diagram of an alternate embodiment of the low voltage signal stripping circuit of FIG. 1.

Referring to FIG. 3, an alternate embodiment of a low voltage signal stripping circuit is shown and generally designated 80. Elements of the low voltage signal stripping circuit 80 which are identical to the elements of the low voltage signal stripping circuit 34 shown in FIG. 2 are designated by the same reference characters. As such, the low voltage signal stripping circuit 80 comprises the high voltage inlet resistor 36, the operational amplifier 38, the first pair of clamping diodes 40, 42, the second pair of clamping diodes 44, 46, and the feedback resistor 48. However, the low voltage signal stripping circuit 80 substitutes a DC shift current source 82 for the DC shift voltage source and resistor of the low voltage signal stripping circuit 34.

The DC shift current source 82 modifies performance of the shifting technique, while achieving substantially the same result as DC shift voltage source and resistor described above. In particular, the DC shift current source 82, which may likewise be the electrical power supply of the reader 12 or a battery separate from the electrical power supply of the reader 12, creates a DC shift current in accordance with any number of well known techniques within the purview of the skilled artisan. The DC shift current is preferably created in correspondence with a level required to cancel current flow into the inlet resistor 36 which results from the specified voltage range on the antenna signal waveform. As is apparent, the practitioner can apply the specified voltage range to substantially any location on the waveform simply by varying the DC shift current.

Figure 4:
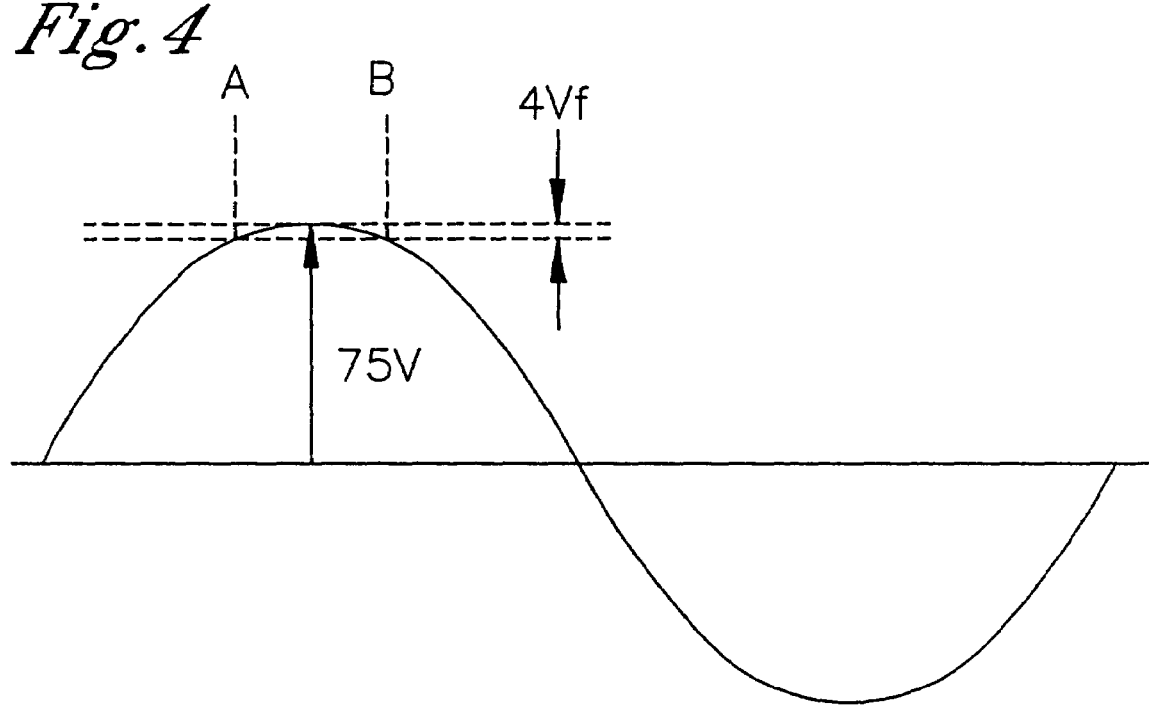
FIG. 4 is a schematic view of a waveform of a high voltage antenna signal input to the low voltage signal stripping circuit.

In accordance with an example of the present shifting and clamping techniques, an antenna signal having a 75V peak, as shown in FIG. 4, is input to the low voltage signal stripping circuit 34. The feedback circuit 64 specifies the size of the portion of the antenna signal waveform to be read by the reader 12 as a portion of the waveform within a 4 Vf range. The DC shift voltage or DC shift current specifies the location on the waveform to which the 4 Vf range is applied as the positive 75V peak of the waveform. This specified waveform portion is designated AB.

Figure 5:
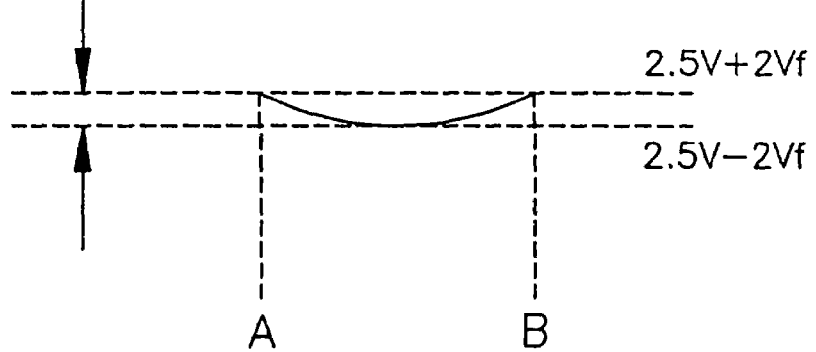
FIG. 5 is a schematic view of a waveform of a low voltage amplifier output signal output from the low voltage signal stripping circuit.

The voltage of the antenna signal is dropped across the inlet resistor 36 of the low voltage signal stripping circuit 34. The resulting inlet resistor output signal is summed with the DC shift voltage or DC shift current and the feedback signal and conducted to the inverting negative input 56 of the operational amplifier 38. The operational amplifier 38 generates an amplifier output signal waveform at the amplifier output 74, as shown in FIG. 5. The amplifier output signal does not exceed the 0 to +5 volt output operating range of the operational amplifier 38 and is in a condition to be read by the reader 12.

While the forgoing preferred embodiments of the invention have been described and shown, it is understood that alternatives and modifications, such as those suggested and others, may be made thereto and fall within the scope of the invention.

I claim:

1. A method for processing a high voltage antenna signal waveform comprising the steps of:
   providing a high voltage antenna signal waveform including a low voltage transponder signal containing readable information superposed on a high voltage excitation signal;
   specifying a location on said waveform where a waveform portion is to be isolated;
   specifying a size of said waveform portion to be isolated at said specified location on said waveform;
   isolating said waveform portion, wherein said waveform portion contains said readable information; and
   reading said readable information on said waveform portion.

2. The method of claim 1, wherein said location is specified by specifying a relative voltage value on said waveform.

3. The method of claim 1, wherein said size of said waveform portion is specified by specifying an absolute voltage range applied to said waveform at said specified location.

4. A method for processing a high voltage antenna signal comprising the steps of:
   receiving a high voltage antenna signal containing readable information from an antenna at an input of a low voltage stripping circuit;
   limiting a voltage of said high voltage antenna signal to create a low voltage output signal containing said readable information;
   creating a DC shift voltage or a DC shift current;
   selectively distributing a feedback signal from an amplifier having an output operating range; and
   creating a summed signal containing said readable information by summing said low voltage output signal, said selectively distributed feedback signal, and said DC shift voltage or said DC shift current.

5. The method of claim 4, wherein said high voltage antenna signal has a voltage exceeding an upper voltage tolerance of said amplifier.

6. The method of claim 4, wherein said low voltage output signal has a voltage below an upper voltage tolerance of said amplifier.

7. The method of claim 4, wherein said voltage of said high voltage antenna signal is limited by passing said high voltage antenna signal through an inlet resistor.

8. The method of claim 4, wherein said amplifier has a first input and a second input held to a substantially matching voltage value, wherein said summed signal is input to said first input and a voltage reference is input to said second input.

9. The method of claim 4, wherein said amplifier has an inverting input and a non-inverting input held to a substantially matching voltage value, wherein said summed signal is input to said inverting input and a voltage reference is input to said non-inverting input.

10. The method of claim 4, wherein said amplifier provides a gain to said summed signal varying as a function of a voltage of said feedback signal distributed to said summed signal, said gain being reduced when said voltage of said feedback signal distributed to said summed signal is outside said predetermined voltage range.

11. The method of claim 4 further comprising passing said summed signal through said amplifier to create an amplifier output signal containing said readable information.

12. The method of claim 11, wherein said amplifier provides a gain to said summed signal in response to said selectively distributed feedback signal to create said amplifier output signal.

13. The method of claim 11 further comprising reading said readable information on said amplifier output signal.

14. A method for processing a high voltage antenna signal comprising the steps of:
    receiving a high voltage antenna signal containing readable information from an antenna at an input of a low voltage stripping circuit;
    limiting a voltage of said high voltage antenna signal to create a low voltage output signal containing said readable information;
    creating a DC shift voltage or a DC shift current;
    selectively distributing a feedback signal from an amplifier having an output operating range, wherein said feedback signal is selectively distributed by a feedback circuit having a first pathway with a low impedance to said feedback signal when a voltage of said feedback signal is above an upper limit of a predetermined voltage range, a second pathway with a low impedance to said feedback signal when said voltage of said feedback signal is below a lower limit of said predetermined voltage range, and a third pathway with a low impedance to said feedback signal when a voltage of said feedback signal is within said predetermined voltage range; and
    creating a summed signal containing said readable information by summing said low voltage output signal, said selectively distributed feedback signal, and said DC shift voltage or said DC shift current.

15. The method of claim 14 further comprising passing said summed signal through said amplifier to create an amplifier output signal containing said readable information.

16. The method of claim 15, wherein said amplifier provides a gain to said summed signal in response to said selectively distributed feedback signal to create said amplifier output signal.

17. The method of claim 15 further comprising reading said readable information on said amplifier output signal.

18. The method of claim 14, wherein said amplifier has a first input and a second input held to a substantially matching voltage value, wherein said summed signal is input to said first input and a voltage reference is input to said second input.

19. The method of claim 14, wherein said amplifier has an inverting input and a non-inverting input held to a substantially matching voltage value, wherein said summed signal is input to said inverting input and a voltage reference is input to said non-inverting input.

20. The method of claim 14, wherein said amplifier provides a gain to said summed signal varying as a function of a voltage of said feedback signal distributed to said summed signal, said gain being reduced when said voltage of said feedback signal distributed to said summed signal is outside said predetermined voltage range.

* * * * *